Dec. 29, 1936. A. F. REILLY Re. 20,222

VANITY CASE

Original Filed March 15, 1932 2 Sheets-Sheet 1

INVENTOR

Alfred F. Reilly

BY Jenney, Blair & Carter

ATTORNEYS

Dec. 29, 1936. A. F. REILLY Re. 20,222

VANITY CASE

Original Filed March 15, 1932 2 Sheets-Sheet 2

INVENTOR

Alfred F. Reilly

BY Jenney, Blair & Co.

ATTORNEYS

Reissued Dec. 29, 1936

Re. 20,222

UNITED STATES PATENT OFFICE 20,222

VANITY CASE

Alfred F. Reilly, North Attleboro, Mass., assignor to Evans Case Company, North Attleboro, Mass., a corporation of Massachusetts Original No. 2,001,690, dated May 14, 1935, Serial No. 598,910, March 15, 1932. Application for reissue June 27, 1936, Serial No. 87,912

18 Claims. (Cl. 132—82)

This invention relates to vanity cases, and with regard to certain specific features to a flexible pouch adapted to form part of a vanity case.

One object of the invention is to provide an attractive vanity case. Another object of the invention is to provide a vanity case which may be tightly sealed. Another object of the invention is to provide a vanity case which shall occupy but a small space. Other objects will be in part obvious or in part pointed out hereinafter.

In the accompanying drawings, in which is shown one of various possible embodiments of the mechanical features of this invention.

Similar reference characters refer to similar parts throughout the several views of the drawings.

Figure 3:
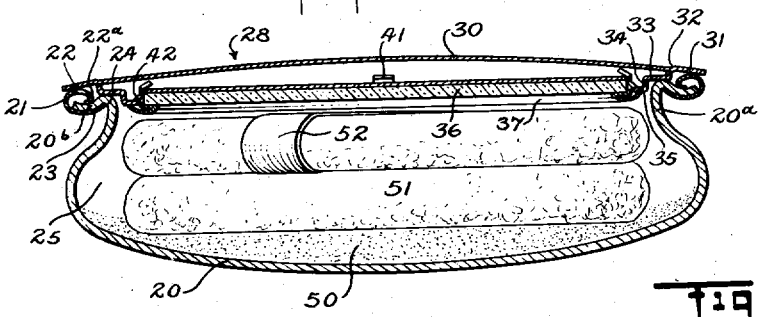
Figure 3 is a sectional view on an enlarged scale, taken on the line 3—3 of Figure 1.

Referring first to Figure 3, I provide a piece of flexible impervious material 20, preferably leather. This material, in a manner which will be hereinafter more fully described, is so shaped that it may be said to lie in or have a surface of the second order, by reason of which, although made of a single piece and having no seam, fold or pucker, it is in the shape of a bag or pouch as shown. The expression "surface of the second order" is a mathematical one and denotes a surface which, for example, could not be made by any amount of folding of a piece of paper. It should be noted that while a cylindrical surface is a surface of the first order, a seamless cylinder cannot be made from a flat, membranous material without change of condition of that material, and thus the existence of a seamless cylindrical portion such as the portion 20*a* of the material 20 distinguishes it in kind from ordinary flat material which is cut and sewn, puckered or similarly treated to force it to assume such a shape.

The material 20 likewise has an annular circumferential portion 20*b* whose surface, after the material is formed, is in a plane and thus is a surface of the first order, this portion 20*b* merging with and being seamlessly integral with the remainder of the material 20.

Still referring to Figure 3, I provide a ring 21 which is preferably of a single piece of metal and has extending around its entire circumference an upper and inwardly extending portion 22, and a lower inwardly extending portion 23 that likewise extends around the entire circumference of the ring 21 and preferably further toward the center than does the portion 22. The portion 20*b* of the material 20 is held by the ring 21 between the upper and lower portions 22 and 23, and by reason of the underlapping of the lower portion 23, portion 20*b* of the material 20 is supported by the ring 21, and its upper surface inwardly and beyond the end of the upper portion 22 constitutes a gasket 24, preferably of leather, to create a tight seal at this point, by cooperation with cover elements that will be hereinafter described, for the compartment 25 formed by the material 20 which as shown extends downwardly from the ring 21.

Figure 4:
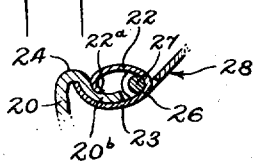
Figure 4 is a fragmentary sectional view on an enlarged scale taken on the line 4—4 of Figure 2.

Preferably, as indicated in Figures 3 and 4, the upper portion 22 is rounded over having a curled over portion 22*a* which bites into the leather 20*b* thus holding the pouch 20 securely to the ring 21. For the assembly of these two parts, the portions 22 and 23 of the ring 21 are initially spaced apart so as to allow the portion 20*b* to be inserted between them, and when this has been done they are pressed together with a press and the portion 22*a* bites into the leather and securely holds the leather to the ring 21. Preferably also, the under portions 23 is rolled upwardly after the insertion of the flat portion 20*b* of the leather, thus to form with the curled over portion 22*a* a lock to securely hold the pouch.

Figure 1:
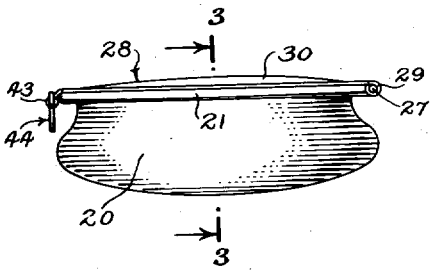
Fig. 1 is a front elevation of a vanity case constructed in accordance with the invention.
Figure 2:
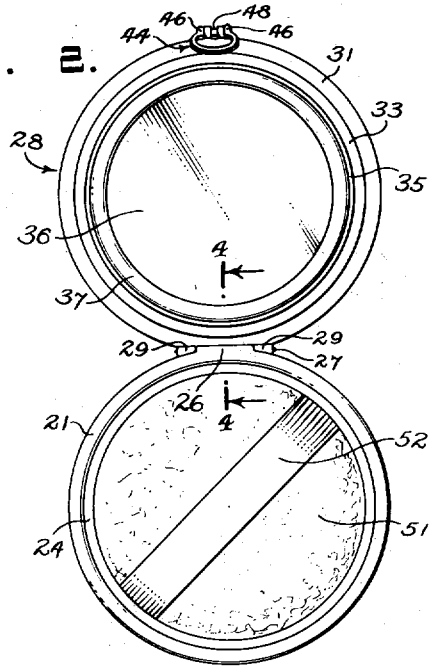
Figure 2 is a plan view of the inside of the vanity case and its cover.

Referring now to Figures 1, 2 and 4, a hinge element 26 is attached to or formed integral with the ring 21. Preferably, in order to avoid the use of solder or the like, this hinge element 26 is formed by pressing outwardly a portion of the circumference of the ring 21, and then cutting substantially triangular shaped pieces out of opposite sides of a central portion which thus constitutes the hinge element and through which may be passed a hinge pin 27. A cover which is generally designated by the numeral 28 has a pair of hinge elements 29, 29 which preferably are integral with it to avoid the use of solder, and by means of the parts described cover 28 is hinged to the ring 21.

The cover 28 in this particular embodiment of the invention comprises a disc-like piece of sheet metal 30 having an outer peripheral portion 31 bounded on the inside by an annular indentation 32, the central portion of the sheet metal being desirably slightly bulged as shown in Figures 1 and 3 to give strength to the cover and to enhance the appearance thereof. The hinge elements 29, 29 may be made by striking downwardly a portion of the metal of the cover; in other words, when the cover is initially cut, projecting portions are left in the otherwise circular piece of metal.

Referring now to Figure 3, suitably secured to the sheet metal 30, as by soldering, is an annular seat member 33 preferably of metal, which when the cover 28 is closed presses against the leather gasket 24 thus securely sealing the compartment 25. This annular seat member 33 has a depending portion 34 and an inwardly extending portion 35 which is thus spaced from the underside of the sheet metal member 30. In the space so defined fits a mirror 36 which is held therein by a mirror holding ring 37 which firmly grips the mirror and also provides means for firm attachment to the portion 35 of the annular seat member 33.

Figure 7:
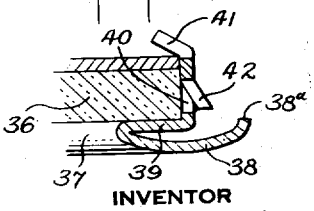
Figure 7 is an enlarged fragmentary sectional view showing the construction of a mirror retaining ring.

Referring now to Figures 3 and 7, the mirror retaining ring 37 is preferably formed of a single piece of metal and, considered in cross-section at any point, the mirror ring includes an arcuate lower portion 38 merging into a flat upper portion 39 from which extends vertically upward a cylindrical portion 40, the latter being spaced from the outside edge of the portion 38 leaving a marginal peripheral part 38a of the portion 38 extending outwardly beyond the outside of the cylindrical portion 40. At a plurality of points in the circumference of the cylindrical portion 40, preferably three or more, are integral upward extensions 41. The mirror 36 is of a size to fit inside the cylindrical portion 40 and to be supported by the portion 39 of the mirror ring 37, and is secured to the mirror ring 37 by bending over the extensions 41, which thus comprise tabs to hold the mirror firmly in place. In the outside of the cylindrical portion 40 are formed a plurality of snaps 42 which may be located in alignment with the tabs 41 and preferably are made by indenting the inner side of the cylindrical portion with a tool which is so shaped that the snaps constitute segments of cones with their bases on the bottom. The outer diameter of the cylindrical portion 40 is less by a slight margin than the inner diameter of the opening defined by the ledge 35, and when the mirror ring 37 is placed in this opening and forced with a certain degree of pressure into it, the snaps 42 give enough to allow it to go into place with the portion 39 against the portion 35, and when that is done the mirror 36 is firmly attached to the cover 28.

Figure 5:
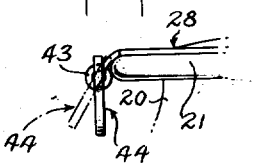
Figure 5 is a fragmentary side elevation on an enlarged scale, showing an unfastened device.
Figure 6:
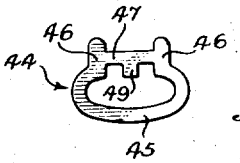
Figure 6 is a front view of the unfastening device.

Referring now to Figure 5, extending from the periphery of the outer portion 31 of the cover 28 and preferably opposite the hinge elements 29 is a downwardly extending loop 43 which may be and preferably is integral with the sheet adapted to embrace the outer rounded edge of the ring 21 and to hold the cover 28 resiliently in closed position, and at the same time it constitutes a pivotal mounting for an unfastening device 44 to permit ready opening of the vanity case. Referring now to Figure 6, this unfastening device 44 includes a looped handle 45 having a pair of inwardly extending arms 46, 46 between which extends in an intermediate position thereof a cross member 47 adapted to be received in the loop 43 for the mounting of the opening device 44. Referring to Figure 2, preferably the loop 43 has a slot 48 in the outer portion thereof through which extends a lug 49 (see Figure 6) formed integrally with the pivotal cross piece 47, this lug constituting a stop to prevent the handle part 45 of the opening device 44 from being raised beyond a certain position. The opening device 44 may be attached to the loop 43 by closing the latter after the cross piece 47 and the lug 49 are placed in position.

When it is desired to close the cover 28, the peripheral portion 31 and the ring 21 are pressed together with the fingers and the cover automatically closes, and it is noted that interference with the closing action by the arms 46, 46 and the opening device 44 is prevented by means of the lug 49. When it is desired to open the vanity case, the handle 45 is raised, which depresses the arms 46, 46 the inside ends of which are in contact with the upper portion of the ring 21, and the device acts as a pry to force the cover and ring 21 apart.

Referring now to Figures 2 and 3, the material 20 constitutes a pouch for the reception of loose powder 50 and also, if desired, a powder puff 51. The powder puff may be of any suitable form, desirably of some soft material and desirably has a ribbon or other holding device 52. By reason of the tight seal between the gasket 24 and the seal member 33, it is practically impossible for powder to escape from the vanity case. It will be noted that all metal parts are located in a disc-like portion of very little width when the cover 28 is in closed position, and consequently the article can be compressed into a very small space. The powder puff used may be itself compressible or a very thin one may be employed if desired.

Figure 8:
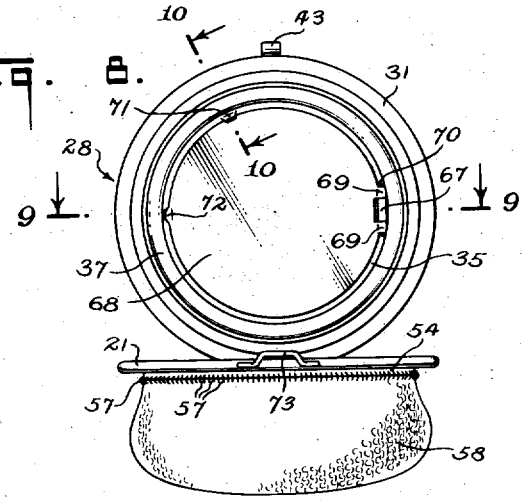
Figure 8 is a front elevation of a modified form of vanity case showing the cover in open position.

Referring now to Figures 8 to 11 inclusive a modification is therein illustrated having certain of the features already described and certain additional desirable features. The material 20 may be and preferably is the same as the material already described in connection with the embodiment of Figures 1 to 7 inclusive, and other parts not specifically mentioned may be the same as already described in connection with the embodiment of Figures 1 to 7 inclusive Referring now more particularly to Figure 9, a metal ring 54 has a downwardly extending cylindrical portion 55 and an outwardly extending peripheral portion 56. The portion 56 is located between the portion 20b of the material 20 and the portion 22 of the ring 21. In this manner the ring 54 is firmly attached to the ring 21 upon assembly of the material 20 and these two rings. Extending circumferentially around the ring 54 as is better indicated in Figure 8 are a plurality of holes for the attachment to the ring 54 of links 57. The links 57 constitute the upper links of a mesh bag 58 which may be of metal or other suitable material. This metal mesh 58 not only gives the article an attractive appearance but also protects the material 20 from wear, without interfering with the collapsibility of the vanity case as a whole. The vanity case is indicated in a collapsed position in Figure 9.

Figure 9:
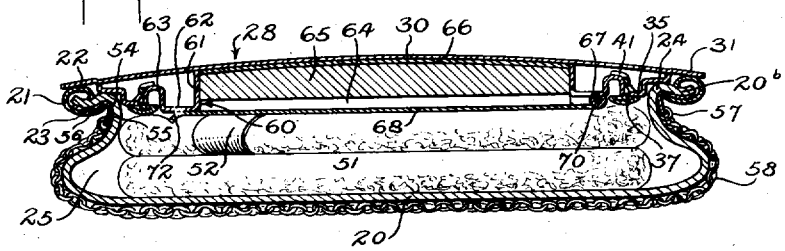
Figure 9 is a sectional view of the vanity case of Figure 8 on an enlarged scale, showing the cover in closed position, the section through the cover being on the line 9—9 of Figure 8 and the section through the bottom part being parallel thereto.
Figure 10:
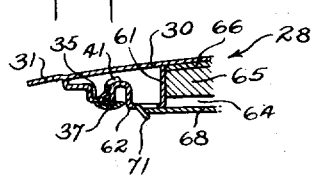
Figure 10 is an enlarged fragmentary sectional view taken on the line 10—10 of Figure 8.

The cover 28 of the modification now being described may retain a mirror such as the mirror 36, but as shown in Figures 8, 9 and 10 there is provided a rouge holding member 60 which interlocks with the ring 37 in the same manner as does the mirror 36. The member 60 desirably comprises a cylindrical portion 61, an outwardly extending portion 62, and a U-shaped portion 63 in the form of an integral ring, the outer edge of the U-shaped portion 63 being retained between the tabs 41 and the portion 39 of the ring 38. The cylindrical portion 61 and the inside 30 of the cover define a compartment 64 for the reception of rouge 65 adhering to a disc 66. Referring to Figure 9, a portion of the metal 62 is struck downwardly and rolled over to form one or more hinge members 67 by means of which a metal disc 68 having corresponding hinge members 69 (see now Figure 8) is hinged to the member 60 by a hinge pin 70. The disc 68 constitutes a cover for the compartment 64 and may be polished to present a mirrored surface.

Referring now to Figures 8, 9 and 10, struck downwardly from the portion 62 of the member 60 is a tab 71 adapted to receive and hold in position the mirror cover 68 which, however, may be opened by inserting the finger nail under a downwardly bent portion 72 constituting an opening device.

Figure 11:
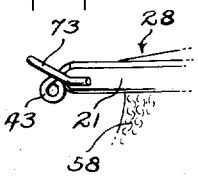
Fig. 11 is a fragmentary view showing a side elevation of a catch.

Referring now to Figures 8 and 11, another style of opening device is shown constituting a U-shaped piece of wire 73 which is secured in any desired manner as by soldering to the ring 21, the front portion thereof being inclined upwardly from the plane of the ring 21. When the member 73 and the loop 43 are grasped between two fingers and pressed together the cover 28 is opened.

It will thus be seen that there has been provided by this invention an article, in which the various objects hereinabove set forth, together with many thoroughly practical advantages, are successfully achieved.

As various possible embodiments might be made of the mechanical features of the above invention, all without departing from the scope of the invention, it is to be understood that all matters hereinbefore set forth or shown in the accompanying drawings is to be interpreted as illustrative and not in a limiting sense.

I claim:

1. In an article of the class described, in combination, means forming an annular metallic ring, an annular support element secured in said ring, and a lined metallic mesh pouch having its edge portion secured to said support element.

2. In an article of the class described, in combination, an annular metallic ring, an annular support element secured in said ring and having spaced openings, a lined metallic mesh pouch comprising a plurality of connected link members, and means extending through said openings and connected to the edge portion of said mesh pouch.

3. In an article of the class described, in combination, means forming a substantially circular metallic ring and including an annular depending flange, a lined metallic mesh pouch comprising a plurality of links, and substantially circular means connected to substantially the edge portion of said pouch and said flange to secure said pouch to said means.

4. In an article of the class described, in combination, a substantially circular metallic ring member, gripping means extending radially of said ring member toward the center thereof, a supporting ring secured to said ring member by said gripping means and including a downwardly extending flange portion, and a lined metallic mesh pouch secured to said flange portion.

5. In an article of the class described, in combination, a substantially circular metallic ring member, gripping means extending radially of said ring member toward the center thereof, a supporting ring secured to said ring member by said gripping means and depending therefrom, said supporting ring including a downwardly extending annular flange portion having a plurality of perforations formed therein, a lined metallic mesh pouch including a plurality of link members, and means connected to some of said link members and extending through said perforations for securing said pouch to said supporting ring.

6. In an article of the class described, in combination, a ring member substantially U-shaped in cross section having its spaced edges extending inwardly toward the center thereof, a pouch having its edge fitting into said ring member and depending downwardly therefrom, an annular member one portion of which fits into said ring member and another portion of which depends downwardly from the lower inner edge thereof, said edge portions of said ring member gripping said first-mentioned portion of said annular member and the edge portion of said pouch to hold them against displacement, a piece of mesh covering said pouch and comprising a plurality of links, and a substantially circular means connected to some of the links of the said pouch and extending through perforations formed in said second-mentioned portion of said annular member to hold said piece in position.

7. In an article of the class described, in combination, means forming a substantially circular metallic ring including an annular downwardly depending flange, a pouch impervious to face powder or the like having its edge portion secured to said means, and a piece of mesh covering said pouch and having its edge portion secured to said flange.

8. In an article of the class described, in combination, means forming a substantially circular ring and including an annular depending flange, a pouch impervious to face powder or the like attached to said ring and depending therefrom, a mesh pouch covering said first mentioned pouch and comprising a plurality of link parts, and substantially circular means connected to substantially the edge portion of said second mentioned pouch and said flange to secure said pouch to said means.

9. In an article of the class described, in combination, a ring member including gripping means extending radially of said ring member, a supporting ring secured to said ring member by said gripping means and depending downwardly therefrom to form an annular flange portion, a pouch impervious to face powder or the like and secured to said ring member by said gripping means, said pouch depending downwardly from said ring member and being located inside of said flange, a metallic mesh pouch including a plurality of link members substantially covering said first mentioned pouch, and means connected to said link members and said flange for securing said pouch to said supporting ring.

10. In an article of the class described, in combination, a ring member substantially U-shaped in cross section having its spaced edges extending inwardly toward the center thereof, a pouch impervious to face powder or the like secured to said ring member, an annular part having a portion extending between the edges of said ring member and gripped thereby and another portion depending downwardly therefrom outside of said pouch, and a mesh pouch having substantially its edge portion connected to said depending portion, said mesh pouch substantially covering said impervious pouch.

11. In an article of the class described, in combination, means including a ring member substantially U-shaped in cross section and having its spaced edges extending inwardly toward the center thereof, the lower edge of said ring member extending further toward the center thereof than the upper edge, and an annular flange member attached thereto and depending downwardly therefrom, a pouch located within said flange and having its edge portion gripped by said edges of said ring member to form an annular ridge substantially adjacent the upper edge portion of said ring member, and a mesh pouch covering said first mentioned pouch and having its edge portion connected to said flange.

12. In an article of the class described, in combination, means including a ring member substantially U-shaped in cross section and having its spaced edges extending inwardly toward the center thereof, the lower edge of said ring member extending further toward the center therof than the upper edge, and an annular flange member attached thereto and depending downwardly therefrom, a pouch located within said flange and having its edge portion gripped by said edges of said ring member to form an annular ridge substantially adjacent the upper edge portion of said ring member, a mesh pouch covering said first mentioned pouch and having its edge portion connected to said flange, a cover hingedly connected to said ring member, and an annular ring connected to the underside of said cover shaped and located to fit firmly against said ridge when said cover is closed down upon said ring member.

13. In an article of the class described, in combination, means including a ring member substantially U-shaped in cross section and having its spaced edges extending inwardly toward the center thereof, the lower edge of said ring member extending further toward the center thereof than the upper edge, and an annular flange member attached thereto and depending downwardly therefrom, a soft flexible impervious pouch located within said flange and having its edge portion gripped by said edges of said ring member to form an annular ridge substantially adjacent the upper edge portion of said ring member, said ridge having a substantially smooth and unruffled surface, a mesh pouch covering said first mentioned pouch and having its edge portion connected to said flange, a cover hingedly connected to said ring member, and an annular rigid ring connected to the underside of said cover shaped and located to fit firmly against said ridge when said cover is closed down upon said ring member, whereby powder within said impervious pouch is retained therein by the gasket fit between said ridge and said last mentioned ring when said cover is closed down on said ring member.

14. In an article of the class described, in combination, an annular metallic ring substantially U-shaped in cross section, a pouch impervious to face powder or the like having its edge portion disposed between and secured within the edges of said ring, support means secured in said ring having openings formed therein, a piece of mesh including a plurality of links covering said pouch, and circular means extending through some of said links along the edge portion of said mesh and through said openings to secure said mesh to said means.

15. In an article of the class described, in combination, an annular metallic ring substantially U-shaped in cross section, the edges of said ring extending towards the center thereof, a pouch impervious to face powder or the like having its edge portion disposed between and secured within the edges of said ring, support means secured in said ring having openings formed therein, a piece of mesh including a plurality of links covering said pouch, and circular means extending through some of said links along the edge portion of said mesh and through said openings to secure said mesh to said means.

16. In an article of the class described, in combination, means forming a substantially circular metallic ring including an annular downwardly depending flange, and a lined metallic mesh pouch having its edge portion secured to said flange.

17. In an article of the class described, in combination, a substantially circular metallic ring means including an annular portion having a plurality of perforations formed therein, a lined metallic mesh pouch comprising a plurality of link members, and means connected to said pouch and extending through said perforations for securing said pouch to said ring member.

18. In an article of the class described, in combination, means including a substantially circular metallic ring substantially U-shaped in cross section, a pouch impervious to face powder or the like having its edge portion disposed between the open edges of said ring, the lower portion of said means having perforations formed therein, a piece of mesh including a plurality of links covering said pouch, and circular means extending through some of said links along the edge portion of said mesh and through said perforations to secure said mesh to said means.

ALFRED F. REILLY.